United States Patent
Ren (10) Patent No.: US 9,582,745 B2
(45) Date of Patent: Feb. 28, 2017

(54) WIRELESS TAG, WIRELESS COMMUNICATION CIRCUIT, AND DEGRADATION DETECTION METHOD

(71) Applicant: SOCIONEXT INC., Yokohama-shi, Kanagawa (JP)

(72) Inventor: Jialin Ren, Kawasaki (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/810,009

(22) Filed: Jul. 27, 2015

(65) Prior Publication Data

US 2016/0048711 A1 Feb. 18, 2016

(30) Foreign Application Priority Data

Aug. 18, 2014 (JP) ................................ 2014-165755

(51) Int. Cl.
*G06K 19/07* (2006.01)
(52) U.S. Cl.
CPC .............................. *G06K 19/0723* (2013.01)
(58) Field of Classification Search
None
See application file for complete search history.

(56) References Cited

U.S. PATENT DOCUMENTS

| | | | | |
|---|---|---|---|---|
| 7,612,325 B1 * | 11/2009 | Watkins, Jr. | ........... | G01N 27/12 250/221 |
| 2003/0171827 A1 | 9/2003 | Keyes, IV et al. | | |
| 2007/0170267 A1 | 7/2007 | Kang et al. | | |
| 2007/0278998 A1 | 12/2007 | Koyama | | |
| 2009/0015408 A1 | 1/2009 | Asai et al. | | |

FOREIGN PATENT DOCUMENTS

| | | |
|---|---|---|
| JP | 2003-330533 A | 11/2003 |
| JP | 2005-30877 A | 2/2005 |
| JP | 2005-149432 A | 6/2005 |
| JP | 2007-525040 A | 8/2007 |
| JP | 2008-11696 A | 1/2008 |
| JP | 2009-20856 A | 1/2009 |
| JP | 2009-507382 A | 2/2009 |
| JP | 2009-224959 A | 10/2009 |
| JP | 2010-106809 A | 5/2010 |
| WO | WO 2004/066077 A2 | 8/2004 |

\* cited by examiner

*Primary Examiner* — Daniell L Negron
(74) *Attorney, Agent, or Firm* — Arent Fox LLP (57) ABSTRACT

A wireless communication circuit performs a wireless communication with a transmitter-receiver via an antenna. Power to the wireless communication circuit is turned on by electromagnetic waves transmitted from the transmitter-receiver. In the wireless communication circuit, a circuit includes a capacitor for storing electric charge at the time of the power being on, and is configured to pass discharging current based on the electric charge stored in the capacitor along a current path including the antenna at the time of the power being off, a monitoring circuit is configured to be operated by electric power based on the electric charge at the time of the power being off and to determine the presence or absence of degradation on the basis of potential of a node on the current path, and a storage circuit is configured to store the result of a determination by the monitoring circuit.

7 Claims, 7 Drawing Sheets

WIRELESS TAG, WIRELESS COMMUNICATION CIRCUIT, AND DEGRADATION DETECTION METHOD

CROSS-REFERENCE TO RELATED APPLICATION

This application is based upon and claims the benefit of priority of the prior Japanese Patent Application No. 2014-165755, filed on Aug. 18, 2014, the entire contents of which are incorporated herein by reference.

FIELD

The embodiments discussed herein are related to a wireless tag, a wireless communication circuit, and a degradation detection method.

BACKGROUND

Systems in which information can be transmitted or received by the use of a wireless signal between a wireless tag which is attached to an article or a person and in which identification information is embedded and a reader-writer have been put to practical use in various fields. Wireless tags are also referred to as radio frequency identification (RFID) tags and include antennas and integrated circuit (IC) chips connected thereto.

In many cases, wireless tags are mass-produced by the use of resin materials or the like.

Japanese Laid-open Patent Publication No. 2009-224959
Japanese Laid-open Patent Publication No. 2005-30877
Japanese National Publication of International Patent Application No. 2009-507382

By the way, with such wireless tags the performance of protecting an antenna may be degraded because of moisture absorption by a resin material or ultraviolet rays. Furthermore, an antenna may be disconnected because of treatment by a user or a crack or the like may appear in a connection between an IC chip and an antenna portion.

In order to detect such degradation of a wireless tag, a measuring device used for measuring the intensity of a signal returned from a wireless tag may be prepared in addition to a reader-writer. By doing so, measurement is made in an environment in which the influence of electromagnetic waves is small. With a wireless tag which receives electric power by resonance, the degradation of an antenna causes a change in input impedance and a resonance frequency deviates from the original resonance frequency. Accordingly, a reader-writer whose resonance frequency is variable is prepared in order to compensate for it.

As stated above, to arrange an evaluation environment costs much labor. Accordingly, it is difficult to detect the degradation of a wireless tag.

SUMMARY

According to an aspect, there is provided a wireless tag including an antenna and a wireless communication circuit configured to perform a wireless communication with a transmitter-receiver via the antenna, power to the wireless communication circuit being turned on by electromagnetic waves transmitted from the transmitter-receiver. The wireless communication circuit includes: a circuit which includes a capacitor for storing electric charge at the time of the power being on, the circuit being configured to pass discharging current based on the electric charge stored in the capacitor along a current path including the antenna at the time of the power being off; a monitoring circuit configured to be operated by electric power based on the electric charge at the time of the power being off and to determine presence or absence of degradation on the basis of potential of a node on the current path; and a storage circuit configured to store a result of a determination by the monitoring circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will now be described with reference to the accompanying drawings, wherein like reference numerals refer to like elements throughout.

First Embodiment

Figure 1:
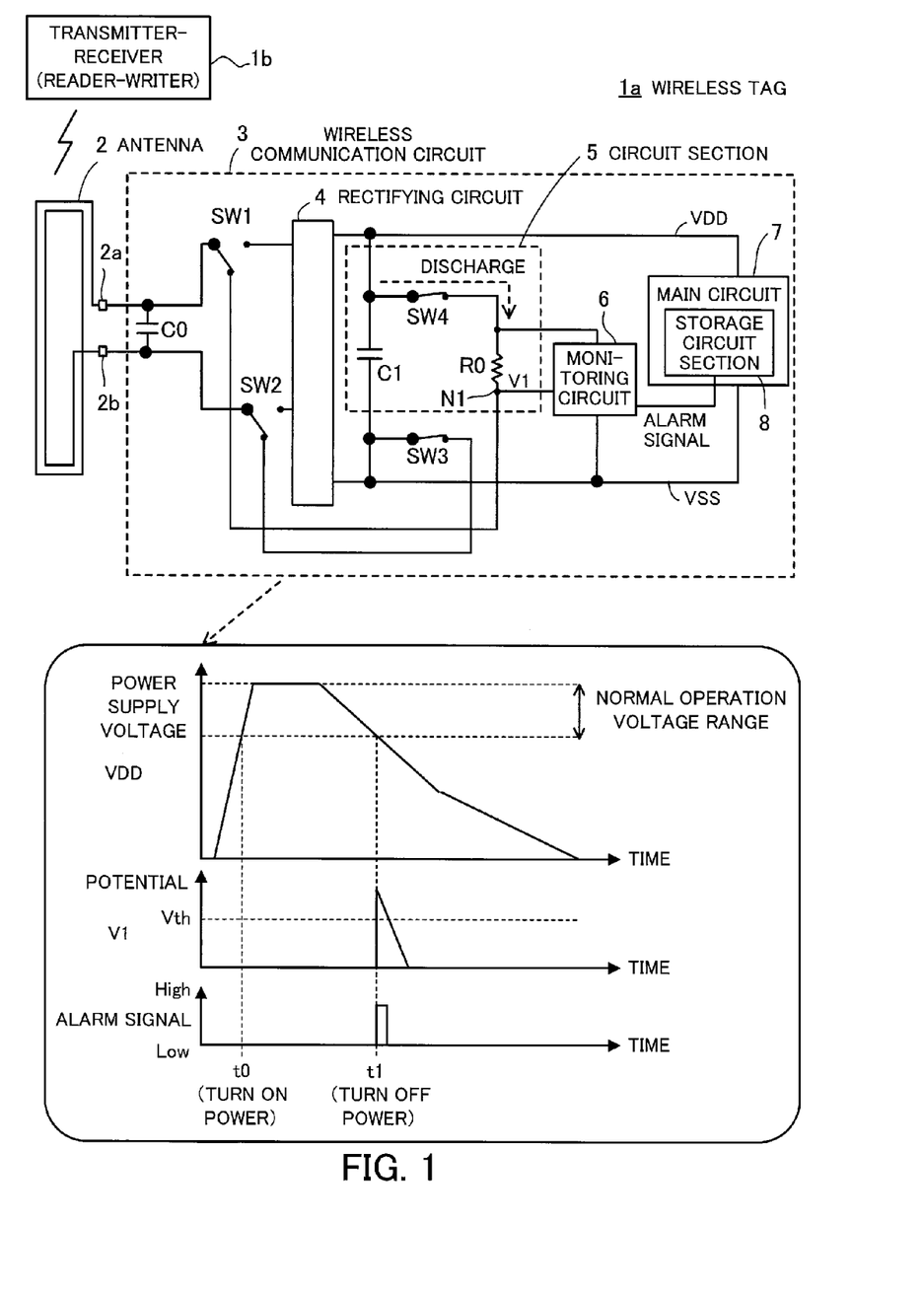
FIG. 1 illustrates an example of a wireless tag according to a first embodiment.

FIG. 1 illustrates an example of a wireless tag according to a first embodiment.

A wireless tag 1a is a passive type tag. That is to say, the wireless tag 1a receives electromagnetic waves (carrier wave) transmitted by a transmitter-receiver (hereinafter referred to as a reader-writer) 1b, generates electric power on the basis of the electromagnetic waves, and performs operation. The wireless tag 1a includes an antenna (coil) 2 and a wireless communication circuit 3 which performs wireless communication with the reader-writer 1b via the antenna 2.

The antenna 2 is connected to the wireless communication circuit 3 at connections 2a and 2b.

The wireless communication circuit 3 is, for example, an IC chip and the power to the wireless communication circuit 3 is turned on by electromagnetic waves transmitted from the reader-writer 1b. The wireless communication circuit 3 includes a capacitor C0, switches SW1, SW2, and SW3, a rectifying circuit 4, a circuit section 5, a monitoring circuit 6, and a main circuit 7.

The capacitor C0 is connected between the connections 2a and 2b. A parallel resonance circuit is realized by the capacitor C0 and the antenna 2. When the antenna 2 receives electromagnetic waves transmitted by the reader-writer 1b, an alternating-current signal induced by the electromagnetic waves is supplied to the rectifying circuit 4 of the wireless communication circuit 3 via the switches SW1 and SW2.

The switches SW1 through SW3 are controlled by the main circuit 7.

The switch SW1 connects the connection 2a to the rectifying circuit 4 or a resistor R0. When wireless communication is being performed between the reader-writer 1b and the wireless communication circuit 3 (hereinafter referred to as normal operation time), the switch SW1 connects the connection 2a and the rectifying circuit 4. When measurement is made to detect the degradation of the wireless tag 1a (hereinafter referred to as monitoring operation time), the switch SW1 connects the connection 2a and the resistor R0.

Monitoring operation is performed at the timing at which the transmission of electromagnetic waves by the reader-writer 1b is stopped and at which power supply voltage deviates from a normal operation voltage range of the wireless tag 1a, that is to say, at the timing at which the power to the wireless communication circuit 3 is turned off.

The switch SW2 connects the connection 2b to the rectifying circuit 4 or the switch SW3. The connection 2b and the rectifying circuit 4 are connected at the normal operation time by the switch SW2 and the connection 2b and the switch SW3 are connected at the monitoring operation time by the switch SW2.

The switch SW3 is connected between the switch SW2 and a power supply line VSS (which is set to, for example, ground potential). The connection between the switch SW2 and the power supply line VSS is interrupted at the normal operation time by the switch SW3 and the switch SW2 and the power supply line VSS are connected at the monitoring operation time by the switch SW3.

The rectifying circuit 4 is, for example, a full-wave rectifier using a diode bridge and rectifies an alternating-current signal outputted from the antenna 2 to generate a rectified signal. Furthermore, the generated rectified signal is smoothed by a capacitor C1 in the circuit section 5 and is outputted to the main circuit 7.

The circuit section 5 includes the capacitor C1. When electric power is generated as a result of receiving electromagnetic waves transmitted from the reader-writer 1b and power supply voltage is in the normal operation voltage range of the wireless tag 1a, that is to say, when the power to the wireless communication circuit 3 is on, electric charge is stored in the capacitor C1. The circuit section 5 passes discharging current based on the electric charge stored in the capacitor C1 along a current path including the antenna 2 at the time of the power to the wireless communication circuit 3 being off.

The capacitor C1 is connected between a power supply line VDD and the power supply line VSS. The capacitor C1 also has the function of smoothing the rectified signal outputted from the rectifying circuit 4.

In addition, the circuit section 5 includes the resistor R0 and a switch SW4.

The resistor R0 is connected between the switch SW4 and the switch SW1.

One end of the switch SW4 is connected between the power supply line VDD and one terminal of the capacitor C1 and the other end of the switch SW4 is connected to the resistor R0 and the monitoring circuit 6. The switch SW4 is off at the normal operation time and is on at the monitoring operation time.

The switch SW4 is off when the power to the wireless communication circuit 3 is on, that is to say, at the normal operation time. As a result, electric charge is stored in the capacitor C1 by a rectified signal outputted from the rectifying circuit 4. Furthermore, the switch SW4 is on when the power to the wireless communication circuit 3 is off, that is to say, at the monitoring operation time. As a result, the electric charge stored in the capacitor C1 is supplied to the monitoring circuit 6 and is discharged via the resistor R0 along the current path including the antenna 2.

The current path along which discharging current flows will now be described.

As stated above, when the power to the wireless communication circuit 3 is off, that is to say, at the monitoring operation time the switch SW4 is on. As a result, the capacitor C1 and the resistor R0 are connected. Furthermore, the resistor R0 and the connection 2a are connected by the switch SW1. In addition, the connection 2b and the switch SW3 are connected by the switch SW2. Moreover, the switch SW3 is on, so the connection 2b is connected to the power supply line VSS via the switches SW2 and SW3. As a result, a current path from the terminal of the capacitor C1 connected to the power supply line VDD, through the resistor R0, the connection 2a, the antenna 2, and the connection 2b, to the power supply line VSS is formed.

Furthermore, it is assumed that the antenna 2 and the like included in the above current path are resistors. In this case, a resistor voltage division circuit including the resistor R0, the connection 2a, the antenna 2, and the connection 2b connected in series is formed between the power supply line VDD and the power supply line VSS. Accordingly, potential V1 of a node N1 between the resistor R0 and the connection 2a is obtained by dividing the voltage of the power supply line VDD on the basis of the ratio of the total resistance value of the current path from the capacitor C1 to the node N1 to the total resistance value of the other portion (portion including the antenna 2) of the current path. As a result, if the antenna 2 itself, the connection 2a, the connection 2b, or the like is degraded, then the total resistance value of the connection 2a, the connection 2b, and the antenna 2 increases. Accordingly, the potential V1 rises.

The resistance value of the resistor R0 is adjusted so that if the antenna 2 is normal, the potential V1 will not exceed a threshold Vth of the monitoring circuit 6 described below.

When the power to the wireless communication circuit 3 is off, the monitoring circuit 6 is operated by electric power based on the electric charge stored in the capacitor C1 and determines the presence or absence of degradation on the basis of the potential V1 of the node N1 on the current path.

For example, the monitoring circuit 6 compares the potential V1 with a determined threshold Vth at the monitoring operation time. If the potential V1 is higher than the threshold Vth, then the monitoring circuit 6 determines that degradation has occurred, and makes an alarm signal to be supplied as a detection result to the main circuit 7 rise from a low level to a high level.

The main circuit 7 includes a storage circuit section 8 which stores the result of a determination by the monitoring circuit 6. For example, when the alarm signal is at the high level, the storage circuit section 8 stores "1". When the alarm signal is at the low level, the storage circuit section 8 stores "0".

The main circuit 7 includes an analog circuit and the like (not illustrated) and performs a modulation process and a demodulation process at the normal operation time. For example, the main circuit 7 reads out data stored in the storage circuit section 8 in accordance with a read command transmitted from the reader-writer 1b by electromagnetic waves, modulates it, and outputs it to the antenna 2 via the rectifying circuit 4.

In the following description it is assumed that the operation of the monitoring circuit 6 or the operation of writing to the storage circuit section 8 can be performed in a voltage range lower than the normal operation voltage range.

An example of the operation of the wireless tag 1a according to the first embodiment will now be described.

Example of Operation of Wireless Tag

A timing chart of the operation of an example of the wireless tag according to the first embodiment is drawn in the lower part of FIG. 1. Furthermore, the state of each of examples of the voltage of the power supply line VDD (power supply voltage), the potential V1, and the alarm signal is indicated in the lower part of FIG. 1.

When the antenna 2 begins to receive electromagnetic waves transmitted from the reader-writer 1b, electric power is generated and the power supply voltage gradually rises.

At timing t0 the power supply voltage reaches the normal operation voltage range of the wireless tag 1a. As a result, the wireless tag 1a goes into a power-on state. Furthermore, at this time the switch SW4 is turned off. Accordingly, electric charge is stored in the capacitor C1 of the circuit section 5 by a rectified signal outputted from the rectifying circuit 4.

When the reader-writer 1b then stops supplying electromagnetic waves, the power supply voltage gradually falls.

At timing t1 the power supply voltage becomes lower than or equal to the normal operation voltage range of the wireless tag 1a. As a result, the wireless tag 1a goes into a power-off state (state in which normal operation is stopped). At this time, however, the switches SW1 through SW4 are put into the above states by the main circuit 7 and the current path along which discharging current based on the electric charge stored in the capacitor C1 flows is formed. Furthermore, the monitoring circuit 6 is operated by electric power supplied from the capacitor C1.

In the example of FIG. 1, at the timing t1 the potential V1 is higher than the threshold Vth of the monitoring circuit 6. As a result, the alarm signal outputted from the monitoring circuit 6 rises from the low level to the high level and the storage circuit section 8 of the main circuit 7 stores, for example, "1" which indicates that degradation has occurred.

When the power to the wireless tag 1a is turned on next, the reader-writer 1b reads out a value stored in the storage circuit section 8. This makes it easy to determine the degradation of the antenna 2.

With the above wireless tag 1a, discharging current is passed along the current path including the antenna 2 at the timing at which the power is off by the use of electric charge stored at the time of the power being on, and the presence or absence of degradation is determined from the potential V1 of the node N1 on the current path. This makes it possible for the wireless tag 1a to self-diagnose degradation. As a result, there is no need to prepare, for the purpose of measuring the degradation of the wireless tag 1a, a measuring device for measuring the intensity of a signal returned from the wireless tag 1a in addition to the reader-writer or to arrange, for the purpose of measuring the degradation of the wireless tag 1a, an environment in which the influence of electromagnetic waves is small. That is to say, the arrangement of an environment in which the wireless tag 1a is evaluated is simplified and the degradation of the wireless tag 1a is detected easily.

In addition, with the wireless tag 1a residual electric charge of the capacitor C1 at the time of the power being off is used for detecting the degradation of the antenna 2. Accordingly, detecting the degradation of the antenna 2 does not cause an increase in current consumption in the wireless tag 1a at standby time or normal operation time. Furthermore, with the wireless tag 1a the degradation of the antenna 2 is detected at the time of the power being off. Accordingly, the normal operation of the wireless tag 1a is not affected.

Moreover, the reader-writer 1b reads out a degradation detection result stored in the storage circuit section 8 at the time of the power to the wireless tag 1a being off when the wireless tag 1a is used next. This makes it possible to determine whether or not the antenna 2 is degraded. As a result, each time the wireless tag 1a is used, whether or not the antenna 2 is degraded is determined. Accordingly, the degradation of the antenna 2 is detected before the antenna 2 is completely damaged.

The above wireless tag 1a is suitable for uses in which high reliability is required. For example, the book stock in a library is managed for not less than ten years, so wireless tags may be degraded. However, if the above wireless tag 1a is adopted, the degradation of the wireless tag 1a is detected before the wireless tag 1a becomes unusable. This prevents a problem from arising.

Second Embodiment

Figure 2:
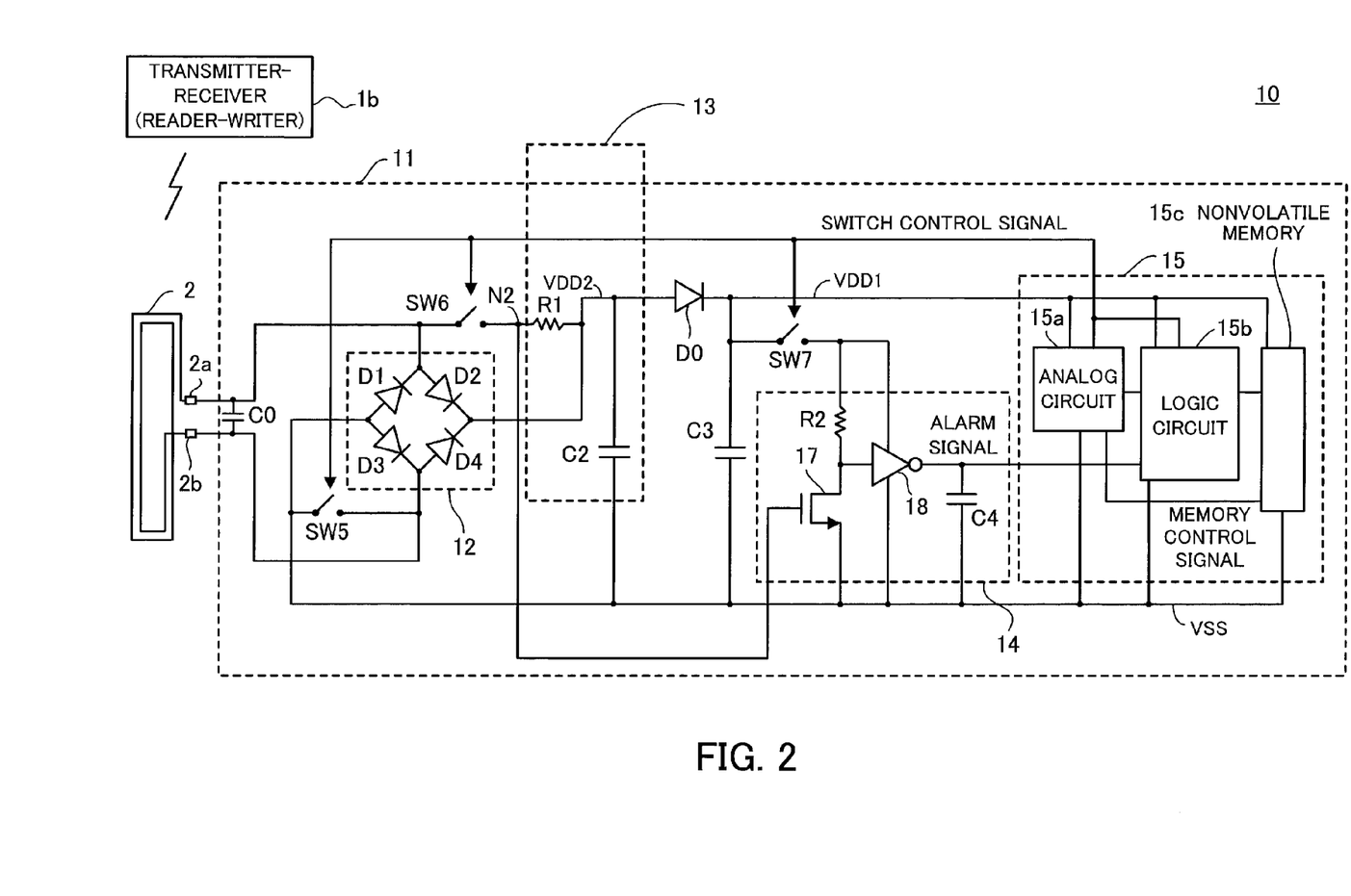
FIG. 2 illustrates an example of a wireless tag according to a second embodiment (normal operation time)
Figure 3:
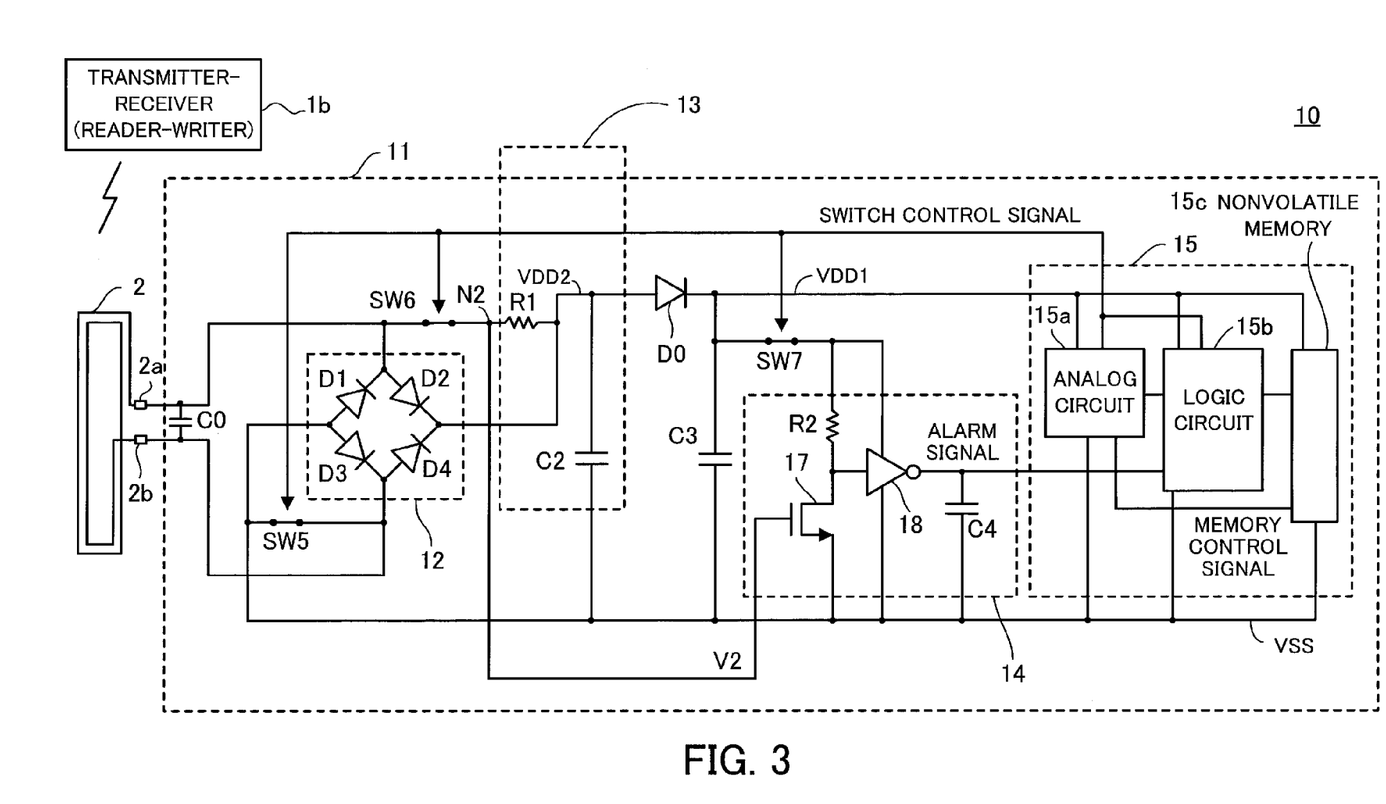
FIG. 3 illustrates an example of the wireless tag according to the second embodiment (monitoring operation time)

FIGS. 2 and 3 illustrate an example of a wireless tag according to a second embodiment. FIG. 2 illustrates the state of a wireless tag 10 at normal operation time. FIG. 3 illustrates the state of the wireless tag 10 at monitoring operation time.

Components of the wireless tag 10 which are the same as those included in the wireless tag 1a according to the first embodiment are marked with the same numerals and part of their descriptions will be omitted.

The wireless tag 10 is a passive type tag and includes an antenna 2 and a wireless communication circuit 11 which performs wireless communication with a reader-writer 1b via the antenna 2 and to which the power is turned on by electromagnetic waves transmitted from the reader-writer 1b.

The wireless communication circuit 11 is, for example, an IC chip and includes a capacitor C0, switches SW5, SW6, and SW7, a rectifying circuit 12, a circuit section 13, a monitoring circuit 14, a main circuit 15, a diode D0, and a capacitor C3.

The switches SW5 through SW7 are controlled by the main circuit 15.

The switch SW5 is connected between a connection 2b and a power supply line VSS. The switch SW5 is turned on at the monitoring operation time and, as illustrated in FIG. 3, connects the connection 2b and the power supply line VSS.

The switch SW6 is connected between a connection 2a and a resistor R1 of the circuit section 13 described later. The switch SW6 is turned on at the monitoring operation time and, as illustrated in FIG. 3, connects the connection 2a and the resistor R1.

The switches SW5 and SW6, together with the circuit section 13 described later, realize the function of the circuit section 5 of the wireless communication circuit 3 in the first embodiment.

One end of the switch SW7 is connected between the capacitor C3 and a power supply line VDD1 and the other end of the switch SW7 is connected to the monitoring circuit 14. The switch SW7 is turned on at the monitoring operation time and, as illustrated in FIG. 3, connects the power supply line VDD1, the capacitor C3, and the monitoring circuit 14.

The rectifying circuit 12 is a full-wave rectifier using a diode bridge and includes diodes D1, D2, D3, and D4 connected like a bridge. A cathode of the diode D1 and an anode of the diode D2 are connected to the connection 2a and the switch SW6. A cathode of the diode D3 and an anode of the diode D4 are connected to the connection 2b and the switch SW5. Furthermore, anodes of the diodes D1 and D3 are connected to the switch SW5 and the power supply line VSS. Cathodes of the diodes D2 and D4 are connected to the resistor R1, one terminal of a capacitor C2 (which is connected to a power supply line VDD2), and an anode of the diode D0.

The rectifying circuit 12 full-wave-rectifies an alternating-current signal outputted from the antenna 2 to generate a rectified signal. Furthermore, the generated rectified signal is smoothed by the capacitor C2 of the circuit section 13 and the capacitor C3 and is outputted to the main circuit 15.

The circuit section 13 includes the resistor R1 and the capacitor C2.

The resistor R1 is connected between the switch SW6 and the one terminal of the capacitor C2 (which is connected to the power supply line VDD2) and the diode D0.

The capacitor C2 is connected between the power supply line VDD2 and the power supply line VSS.

As illustrated in FIG. 2, at the normal operation time the switch SW6 is off. As a result, electric charge is stored in the capacitor C2 by a rectified signal outputted from the rectifying circuit 12. As illustrated in FIG. 3, at the monitoring operation time the switch SW6 is on. As a result, the electric charge stored in the capacitor C2 is discharged via the resistor R1 along a current path including the antenna 2. The current path along which the electric charge stored in the capacitor C2 is discharged will now be described.

At the monitoring operation time illustrated in FIG. 3, as stated above, the switch SW6 is on and the resistor R1 and the connection 2a are connected. Furthermore, the switch SW5 is on and the connection 2b and the power supply line VSS are connected. That is to say, a current path from the terminal of the capacitor C2 connected to the power supply line VDD2, through the resistor R1, the connection 2a, the antenna 2, and the connection 2b, to the power supply line VSS is formed.

Furthermore, it is assumed that the antenna 2 and the like included in the above current path are resistors. In this case, a resistor voltage division circuit including the resistor R1, the connection 2a, the antenna 2, and the connection 2b connected in series is formed between the power supply line VDD2 and the power supply line VSS.

It is assumed that the resistor R1 is a resistor in the wireless communication circuit 11 on the current path. Then potential V2 of a node N2 between the resistor R1 and the connection 2a is obtained by dividing the voltage of the power supply line VDD2 on the basis of the ratio of the resistance value of the resistor R1 to the total resistance value of the connection 2a, the antenna 2, and the connection 2b.

If the antenna 2 itself, the connection 2a, the connection 2b, or the like is degraded, then the above total resistance value increases. Accordingly, the potential V2 rises.

The resistance value of the resistor R1 is adjusted so that if the antenna 2 is normal, the potential V2 will not exceed a threshold Vth of a transistor 17 of the monitoring circuit 14 described later.

An anode of the diode D0 is connected to the terminal of the capacitor C2 connected to the power supply line VDD2, and a cathode of the diode D0 is connected to a terminal of the capacitor C3 connected to the power supply line VDD1.

The capacitor C3 will be described later. The diode D0 prevents electric charge stored in the capacitor C3 at the time of the power being off from flowing out to the capacitor C2.

At the monitoring operation time illustrated in FIG. 3, the electric charge stored in the capacitor C2 is discharged in the above way along the current path. Furthermore, as described later, electric charge stored in the capacitor C3 is supplied to the monitoring circuit 14 and the main circuit 15. Accordingly, the electric charge in the capacitor C2 discharged is consumed more rapidly than the electric charge in the capacitor C3. As a result, the potential of the power supply line VDD2 may become lower than that of the power supply line VDD1. In this case, the electric charge in the capacitor C3 flows out to the capacitor C2. In order to avoid this, the diode D0 is connected.

The capacitor C3 is connected between the power supply line VDD1 and the power supply line VSS.

As illustrated in FIG. 2, at the normal operation time the switch SW7 is off. Accordingly, electric charge is stored in the capacitor C3 by a rectified signal outputted from the rectifying circuit 12. Furthermore, as illustrated in FIG. 3, at the monitoring operation time the switch SW7 is on. Accordingly, the electric charge stored in the capacitor C3 is supplied to the monitoring circuit 14 and the main circuit 15.

The monitoring circuit 14 determines the presence or absence of degradation on the basis of the potential V2 of the node N2 on the above current path. Furthermore, the monitoring circuit 14 informs the main circuit 15 of a determination result as an alarm signal.

The monitoring circuit 14 includes the transistor 17, which is an n-channel transistor, a resistor R2, an inverter circuit 18, and a capacitor C4.

A gate of the transistor 17 is connected to the node N2, one input-output terminal (source) of the transistor 17 is connected to the power supply line VSS. Furthermore, the other input-output terminal (drain) of the transistor 17 is connected to the resistor R2 and an input terminal of the inverter circuit 18.

The resistor R2 is connected between the switch SW7 and the input-output terminal (drain) of the transistor 17.

The input terminal of the inverter circuit 18 is connected between the resistor R2 and the input-output terminal (drain) of the transistor 17. An output terminal of the inverter circuit 18 is connected to a logic circuit 15b of the main circuit 15. Furthermore, a power supply terminal of the inverter circuit 18 is connected to the switch SW7 and a ground terminal of the inverter circuit 18 is connected to the power supply line VSS.

The capacitor C4 is connected between the output terminal of the inverter circuit 18 and the power supply line VSS.

As illustrated in FIG. 3, at the monitoring operation time the switch SW7 is on. Accordingly, electric charge stored in the capacitor C3 is supplied to the power supply terminal of the inverter circuit 18 and is supplied to the input-output terminal (drain) of the transistor 17 via the resistor R2. Furthermore, the potential of the gate of the transistor 17 becomes the potential V2.

As stated above, if the antenna 2, the connection 2a, or the connection 2b is degraded, the potential V2 rises. When the potential V2 exceeds the threshold Vth of the transistor 17, the transistor 17 is turned on and electric charge supplied from the capacitor C3 to the input-output terminal (drain) of the transistor 17 is discharged to the input-output terminal (source) of the transistor 17. As a result, the potential of the input-output terminal (drain) of the transistor 17, that is to say, the potential of the input terminal of the inverter circuit 18 falls. Furthermore, when the potential of the input terminal of the inverter circuit 18 reaches an inversion threshold of the inverter circuit 18, the inverter circuit 18 outputs to the main circuit 15 an alarm signal whose logical level is a high level.

As stated above, if the antenna 2, the connection 2a, or the connection 2b is not degraded, the potential V2 does not reach the threshold Vth of the transistor 17 and the transistor 17 is not turned on. Accordingly, the potential of the input-output terminal (drain) of the transistor 17, that is to say, the potential of the input terminal of the inverter circuit 18 remains high because electric charge is supplied from the capacitor C3. As a result, an alarm signal outputted from the inverter circuit 18 is at a low level.

The main circuit 15 includes an analog circuit 15a, the logic circuit 15b, and a nonvolatile memory 15c.

The analog circuit 15a is connected between the power supply line VDD1 and the power supply line VSS. The analog circuit 15a is a control circuit which performs processes such as modulation for transmitting data read out from the nonvolatile memory 15c to the reader-writer 1b via the antenna 2 and demodulation of received data. Furthermore, the analog circuit 15a is connected to the logic circuit 15b to transmit a signal to or receive a signal from the logic circuit 15b. In addition, the analog circuit 15a is connected to the nonvolatile memory 15c and outputs a memory control signal to control the nonvolatile memory 15c.

When the power is off, the analog circuit 15a is operated by electric power supplied from the capacitor C3. Furthermore, if the potential of the power supply line VDD1 falls when the power is off, the analog circuit 15a turns on the switches SW5 through SW7 by a switch control signal to perform monitoring operation.

The logic circuit 15b is also connected between the power supply line VDD1 and the power supply line VSS. The logic circuit 15b is a control circuit which performs logical processing of a digital signal or the like supplied from the analog circuit 15a. Furthermore, the logic circuit 15b outputs data, an address signal, a write signal, or the like to the nonvolatile memory 15c.

When the power is off, the logic circuit 15b is operated by electric power supplied from the capacitor C3. For example, the logic circuit 15b receives a switch control signal to designate an address in the nonvolatile memory 15c at which the result of detection by the monitoring circuit 14 is to be written, supply a write signal to the nonvolatile memory 15c, and so on at the timing at which the switches SW5 through SW7 are turned on by the switch control signal. Furthermore, on the basis of the value of an alarm signal supplied from the monitoring circuit 14, the logic circuit 15b writes, for example, "1" or "0" as a detection result to the nonvolatile memory 15c.

The nonvolatile memory 15c is also connected between the power supply line VDD1 and the power supply line VSS. The nonvolatile memory 15c stores data used by the wireless tag 10, a detection result of the above degradation, and the like. A ferroelectric random access memory (FeRAM), a flash memory, or the like is used as the nonvolatile memory 15c.

When the power is off, the nonvolatile memory 15c is operated by electric power supplied from the capacitor C3, and stores a value ("0" or "1", for example) corresponding to an alarm signal as a determination value of the presence or absence of degradation.

An example of the operation of the wireless tag 10 according to the second embodiment will now be described. First an example of the operation of the wireless tag 10 in a state in which the antenna 2 is not degraded, that is to say, in a state in which the antenna 2 is normal will be described.

Example 1 of Operation of Wireless Tag

Figure 4:
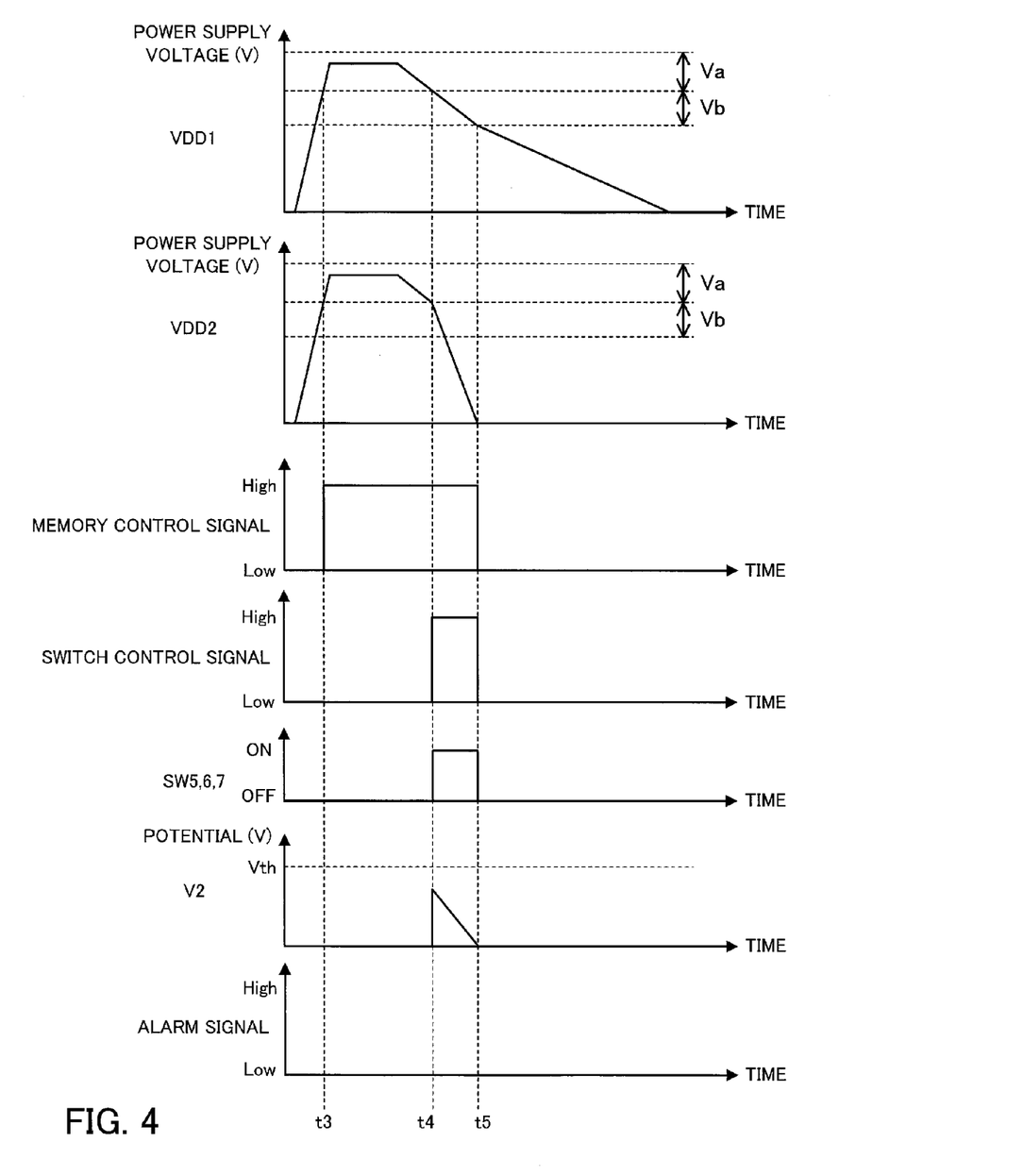
FIG. 4 is a timing chart of the operation of an example of the wireless tag according to the second embodiment in a state in which an antenna or the like is not degraded.

FIG. 4 is a timing chart of the operation of an example of the wireless tag according to the second embodiment in a state in which the antenna or the like is not degraded.

FIG. 4 illustrates the states of examples of the voltage (power supply voltage) of the power supply line VDD1, the voltage (power supply voltage) of the power supply line VDD2, a memory control signal, a switch control signal, the switches SW5 through SW7, the potential V2, and an alarm signal. In addition, FIG. 4 illustrates a voltage range Va of power supply voltage in which the normal operation of the wireless tag 10 is performed and a voltage range Vb of power supply voltage in which the operation of the monitoring circuit 14 and the main circuit 15 is performed at the time of the power being off.

When the antenna 2 begins to receive electromagnetic waves transmitted from the reader-writer 1b, the power supply voltages of the power supply lines VDD1 and VDD2 gradually rise.

At timing t3 the power supply voltages of the power supply lines VDD1 and VDD2 reach the voltage range Va. As a result, the wireless tag 10 goes into a power-on state in which normal operation is performed. At this time a read process in which data written to the nonvolatile memory 15c is read out, is modulated by the analog circuit 15a, is rectified by the rectifying circuit 12, and is transmitted to the reader-writer 1b via the antenna 2, a write process, or the like is performed.

Furthermore, at this time the switches SW5, SW6, and SW7 are off, so electric charge is stored in the capacitors C2 and C3 by a rectified signal outputted from the rectifying circuit 12.

In addition, at the timing t3 the power supply voltage of the power supply line VDD1 reaches the voltage range Va. As a result, a memory control signal supplied from the analog circuit 15a to the nonvolatile memory 15c rises from a low level to a high level.

When after that the reader-writer 1b stops supplying electromagnetic waves, the power supply voltages of the power supply lines VDD1 and VDD2 gradually fall.

At timing t4 the power supply voltages of the power supply lines VDD1 and VDD2 become lower than or equal to the voltage range Va. As a result, the wireless tag 10 goes into a power-off state (state in which normal operation is stopped) and the monitoring circuit 14 and the main circuit 15 are operated by electric power supplied from the capacitor C3.

When the power supply voltage of the power supply line VDD1 falls to the voltage range Vb, the analog circuit 15a makes a switch control signal rise from a low level to a high level. By doing so, the switches SW5 through SW7 are turned on. As a result, the electric charge stored in the capacitor C2 is discharged to the power supply line VSS via the resistor R1, the connection 2a, the antenna 2, and the connection 2b.

Furthermore, at the timing t4 the potential V2 rises from 0 V. However, if the antenna 2 or the like is not degraded, the potential V2 does not reach the threshold Vth of the transistor 17 of the monitoring circuit 14. Accordingly, the logic circuit 15b keeps an alarm signal at a low level. As a result, "0", for example, is stored in the nonvolatile memory 15c.

At timing t5 the power supply voltage of the power supply line VDD1 becomes lower than or equal to the voltage range Vb. Accordingly, the switch control signal outputted from the analog circuit 15a falls to the low level and the switches SW5 through SW7 are turned off. As a result, electric power is not supplied from the capacitor C3, so the monitoring circuit 14 and the main circuit 15 stop the operation.

Figure 5:
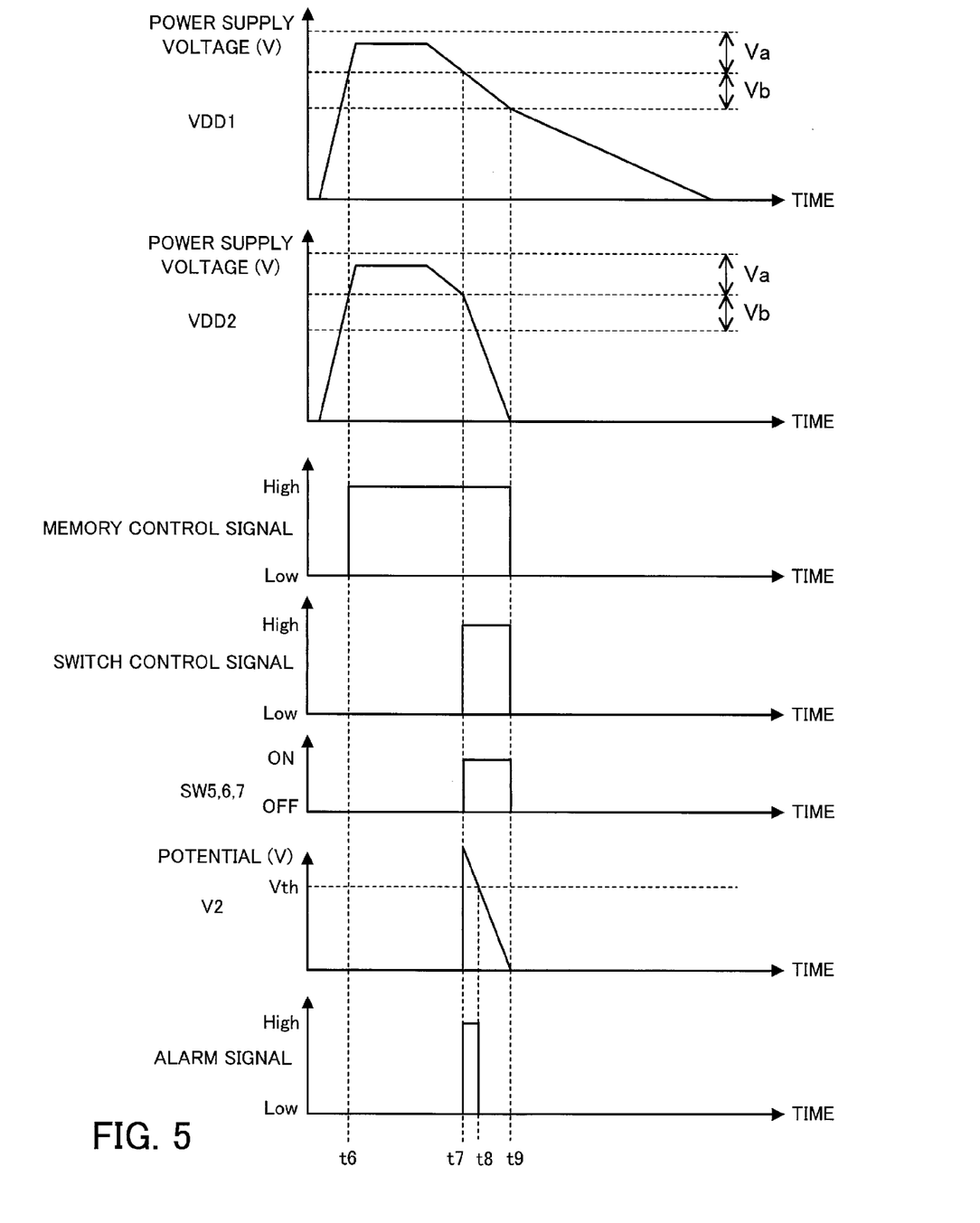
FIG. 5 is a timing chart of the operation of an example of the wireless tag according to the second embodiment in a state in which the antenna or the like is degraded.

Next, an example of the operation of the wireless tag 10 in a state in which the antenna 2 or the like is degraded will be described.

Example 2 of Operation of Wireless Tag

FIG. 5 is a timing chart of the operation of an example of the wireless tag according to the second embodiment in a state in which the antenna or the like is degraded.

FIG. 5 illustrates the states of the same signals, the same voltages, and the like that are illustrated in FIG. 4 in the wireless tag according to the second embodiment in a state in which the antenna or the like is degraded.

The operation of the wireless tag according to the second embodiment at timing t6 is the same as that of the wireless tag according to the second embodiment at the timing t3 illustrated in FIG. 4.

If the antenna 2, the connection 2a, or the connection 2b is degraded, at timing t7 the potential V2 is high compared with a case where the antenna 2, the connection 2a, or the connection 2b is not degraded. In the example of FIG. 5, the potential V2 is higher than the threshold Vth of the transistor 17 of the monitoring circuit 14. Accordingly, an alarm signal outputted from the inverter circuit 18 of the monitoring circuit 14 becomes a high level. As a result, "1", for example, is stored in the nonvolatile memory 15c.

At timing t8 the potential V2 becomes lower than or equal to the threshold Vth of the transistor 17 of the monitoring circuit 14. Accordingly, the alarm signal falls from the high level to a low level.

A process at timing t9 is the same as the process at the timing t5 illustrated in FIG. 4.

The reader-writer 1b reads out 1-bit data indicative of the presence or absence of degradation stored in the nonvolatile memory 15c when the power to the wireless tag 10 is turned on next for use (timing t3 or t6 in the example of FIG. 4 or 5). By doing so, the presence or absence of the degradation of the antenna 2 is detected. For example, if the data read out is "0", then the reader-writer 1b determines that the antenna 2 is normal. If the data read out is "1", then the reader-writer 1b determines that the antenna 2 is degraded. If the reader-writer 1b determines that the antenna 2 is degraded, then the reader-writer 1b may display, for example, the warning "The degradation of the antenna is detected. Replace it early." on a display unit.

Figure 6:
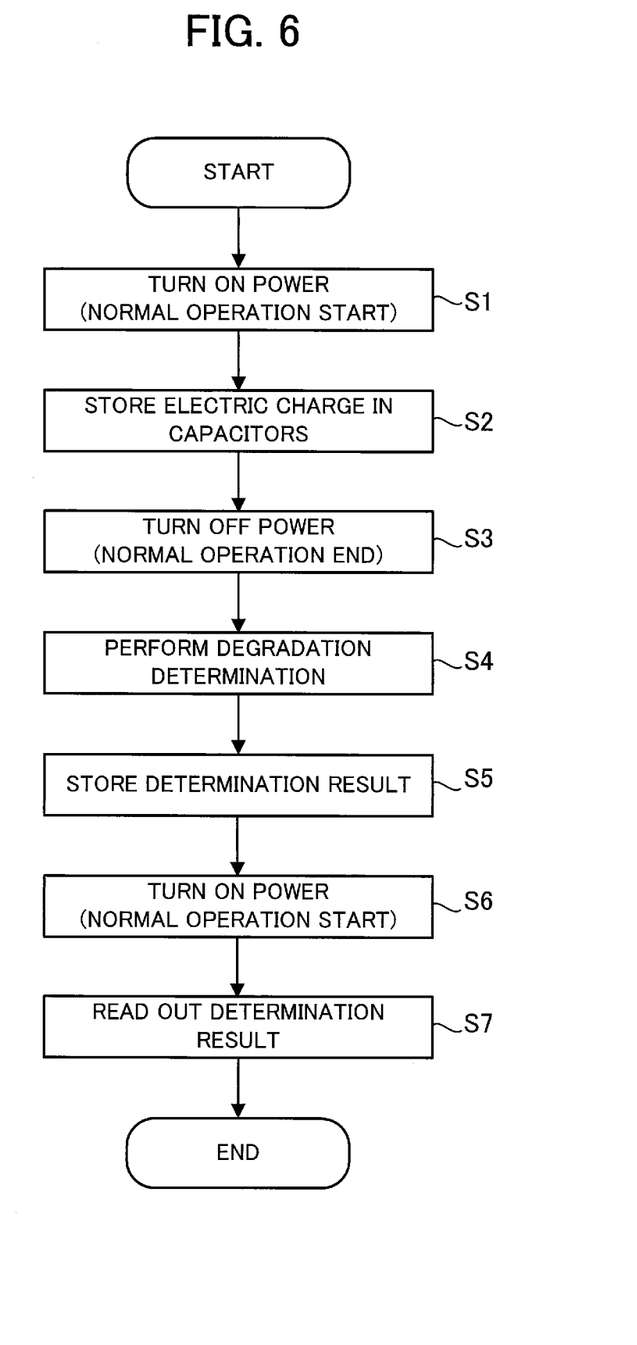
FIG. 6 is a flow chart of an example of a degradation detection method.

The flow of a degradation detection method including the operation of the reader-writer 1b will now be summarized by the use of a flow chart.

FIG. 6 is a flow chart of an example of a degradation detection method.

First the reader-writer 1b transmits electromagnetic waves to the wireless tag 10 to turn on the power to the wireless tag 10 (step S1). As a result, normal operation of the wireless tag 10 is started. In addition, when the power to the wireless tag 10 is turned on, electric charge is stored in the capacitors C2 and C3 in the wireless tag 10 (step S2).

The reader-writer 1b stops transmitting electromagnetic waves to turn off the power to the wireless tag 10 (step S1). As a result, the normal operation of the wireless tag 10 ends.

In the wireless tag 10, however, the above degradation determination is performed by electric power based on the electric charge stored in the capacitors C2 and C3 (step S4).

The result of the degradation determination is stored in the nonvolatile memory 15c (step S5).

Next, when the reader-writer 1b turns on the power to the wireless tag 10 and normal operation is started (step S6), the wireless tag 10 reads out data indicative of the determination result stored in the nonvolatile memory 15c, and outputs the data indicative of the determination result read out to the reader-writer 1b via the antenna 2 (step S7).

With the above wireless tag 10 and the degradation detection method using it, the same effect that is obtained by the wireless tag 1a according to the first embodiment is achieved.

Furthermore, the wireless tag 10 includes the two capacitors C2 and C3. Electric charge stored in the capacitor C2 at the normal operation time is discharged along the current path at the time of the power being off. Electric charge stored in the capacitor C3 is used for supplying electric power to the monitoring circuit 14 and the main circuit 15. By doing so, the peak value of current discharged along the current path is ensured and the operation of the monitoring circuit 14 and the main circuit 15 is stabilized.

Modification

Figure 7:
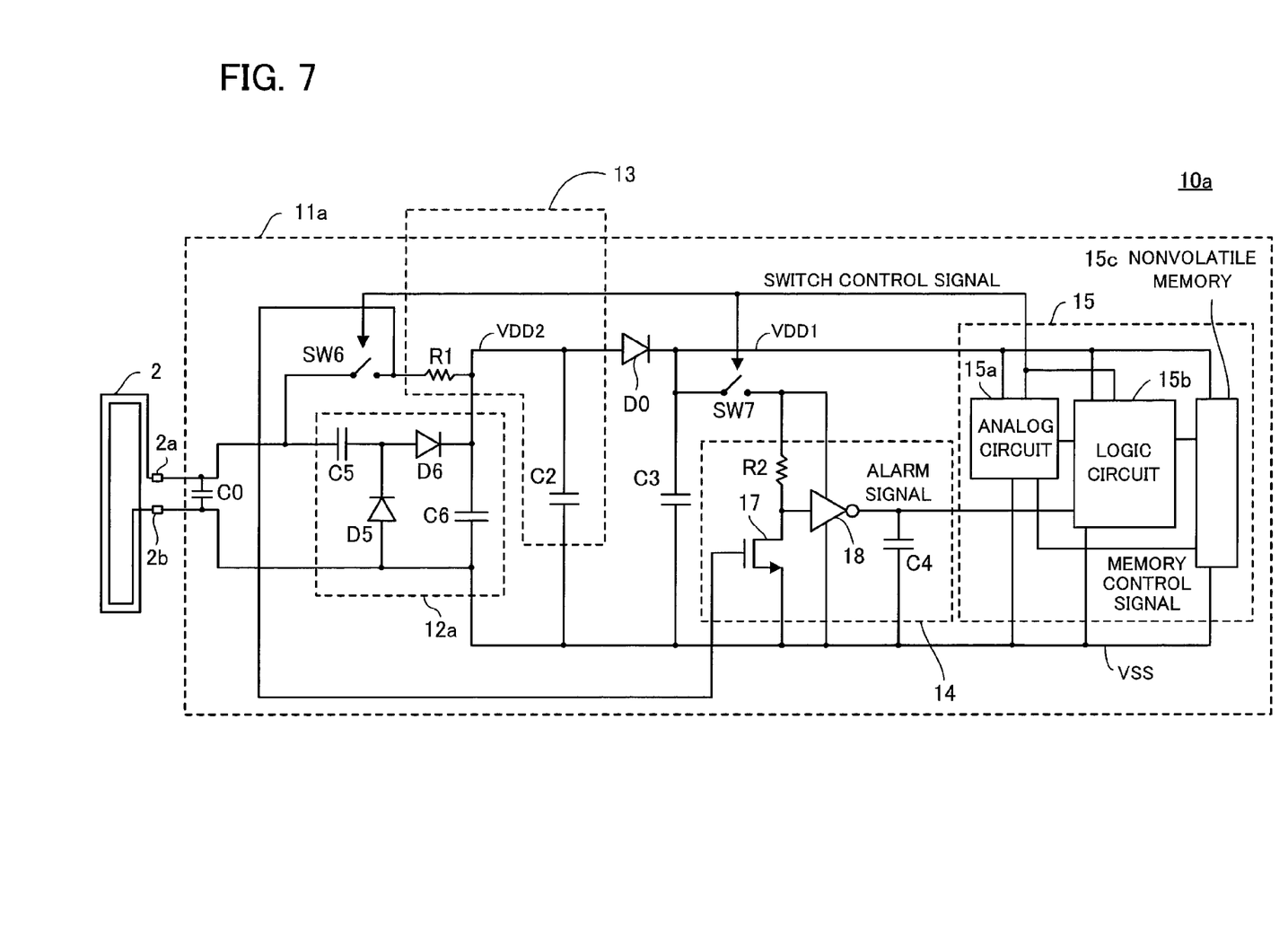
FIG. 7 illustrates a modification of the wireless tag according to the second embodiment.

FIG. 7 illustrates a modification of the wireless tag according to the second embodiment. Components in FIG. 7 which are the same as those included in the wireless tag 10 illustrated in FIG. 2 are marked with the same numerals and their descriptions will be omitted.

A rectifying circuit 12a in a wireless communication circuit 11a in a wireless tag 10a differs from the rectifying circuit 12 in the wireless communication circuit 11 illustrated in FIG. 2 or 3 in that it is a half-wave rectifier including capacitors C5 and C6 and diodes D5 and D6.

One terminal of the capacitor C5 is connected to a connection 2a, one terminal of a capacitor C0, and one end of a switch SW6. The other terminal of the capacitor C5 is connected to a cathode of the diode D5 and an anode of the diode D6. Furthermore, one terminal of the capacitor C6 is connected to a cathode of the diode D6, a resistor R1, and a power supply line VDD2. The other terminal of the capacitor C6 is connected to a power supply line VSS.

The cathode of the diode D5 is connected between the other terminal of the capacitor C5 and the anode of the diode D6. An anode of the diode D5 is connected to the power supply line VSS. Furthermore, the anode of the diode D6 is connected to the other terminal of the capacitor C5 and the cathode of the diode D5. The cathode of the diode D6 is connected to the one terminal of the capacitor C6, the resistor R1, and the power supply line VDD2.

By adopting the above wireless tag 10a, the same effect that is obtained by the wireless tag 10 is achieved.

According to the disclosed wireless tag, wireless communication circuit, and degradation detection method, the degradation of a wireless tag is detected easily.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A wireless device comprising:
an antenna; and
a wireless communication circuit configured to perform a wireless communication with a transmitter-receiver via the antenna, power to the wireless communication circuit being turned on by electromagnetic waves transmitted from the transmitter-receiver,
the wireless communication circuit including:
a circuit which includes a first capacitor for storing first electric charge and a second capacitor for storing second electric charge at the time of the power being on, the circuit being configured to pass discharging current based on the first electric charge stored in the first capacitor along a current path including the antenna at the time of the power being off;
a monitoring circuit configured to be operated at the time of the power being off by electric power based on the second electric charge stored in the second capacitor and to determine presence or absence of degradation on the basis of potential of a node on the current path; and
a storage circuit configured to store a result of a determination by the monitoring circuit.

2. The wireless device according to claim 1, wherein a diode which prevents the second electric charge stored in the second capacitor from flowing out to the first capacitor is connected between the first capacitor and the second capacitor.

3. The wireless device according to claim 1, wherein the wireless communication circuit includes:
a first switch disposed between the antenna and the first capacitor;
a second switch disposed between the monitoring circuit and the second capacitor; and
a control circuit configured to turn on the first switch so as to pass the discharging current based on the first electric charge along the current path at the time of the power being off and to turn on the second switch so as to operate the monitoring circuit by the electric power based on the second electric charge.

4. A wireless communication circuit configured to perform a wireless communication with a transmitter-receiver via an antenna, power to the wireless communication circuit being turned on by electromagnetic waves transmitted from the transmitter-receiver, the wireless communication circuit comprising:
a circuit which includes a first capacitor for storing first electric charge and a second capacitor for storing second electric charge at the time of the power being on, the circuit being configured to pass discharging current based on the first electric charge stored in the first capacitor along a current path including the antenna at the time of the power being off;
a monitoring circuit configured to be operated at the time of the power being off by electric power based on the second electric charge stored in the second capacitor and to determine presence or absence of degradation on the basis of potential of a node on the current path; and
a storage circuit configured to store a result of a determination by the monitoring circuit.

5. The wireless communication circuit according to claim 4, wherein a diode which prevents the second electric charge stored in the second capacitor from flowing out to the first capacitor is connected between the first capacitor and the second capacitor.

6. The wireless communication circuit according to claim 4 further comprising:
a first switch disposed between the antenna and the first capacitor;
a second switch disposed between the monitoring circuit and the second capacitor; and
a control circuit configured to turn on the first switch so as to pass the discharging current based on the first electric charge along the current path at the time of the power being off and to turn on the second switch so as to operate the monitoring circuit by the electric power based on the second electric charge.

7. A degradation detection method for detecting degradation of a wireless device including an antenna and a wireless communication circuit configured to perform a wireless communication with a transmitter-receiver via the antenna, the method comprising:
transmitting, by the transmitter-receiver, electromagnetic waves to the wireless tag to turn on power to the wireless tag;
storing, by the wireless communication circuit, first electric charge in a first capacitor and second electric charge in a second capacitor at the time of the power being on;
stopping, by the transmitter-receiver, transmitting the electromagnetic waves to turn off the power;
passing, by the wireless communication circuit, discharging current based on the first electric charge stored in the first capacitor along a current path including the antenna at the time of the power being off;
determining, by the wireless communication circuit which is operated at the time of the power being off by electric power based on the second electric charge stored in the second capacitor, presence or absence of degradation on the basis of potential of a node on the current path;
storing, by the wireless communication circuit, a result of a determination of the presence or absence of degradation in a storage circuit; and
reading out, by the wireless communication circuit, the result of the determination stored in the storage circuit at the time of the power being turned on after storing the result of the determination, and outputting, by the wireless communication circuit, the result of the determination read out to the transmitter-receiver via the antenna.

* * * * *